US011921680B2

(12) United States Patent
Scrivano et al.

(10) Patent No.: US 11,921,680 B2
(45) Date of Patent: Mar. 5, 2024

(54) SPEEDUP CONTAINERS IN PRODUCTION BY IGNORING SYNC TO FILE SYSTEM

(71) Applicant: RED HAT, INC., Raleigh, NC (US)

(72) Inventors: Giuseppe Scrivano, Milan (IT); Daniel Walsh, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 44 days.

(21) Appl. No.: 17/038,462

(22) Filed: Sep. 30, 2020

(65) Prior Publication Data

US 2022/0012212 A1 Jan. 13, 2022

Related U.S. Application Data

(60) Provisional application No. 63/051,289, filed on Jul. 13, 2020.

(51) Int. Cl.
*G06F 7/00* (2006.01)
*G06F 16/14* (2019.01)
*G06F 16/16* (2019.01)
*G06F 16/17* (2019.01)
*G06F 16/178* (2019.01)
*G06F 16/182* (2019.01)

(52) U.S. Cl.
CPC ........ *G06F 16/1824* (2019.01); *G06F 16/148* (2019.01); *G06F 16/164* (2019.01); *G06F 16/1734* (2019.01); *G06F 16/178* (2019.01)

(58) Field of Classification Search
CPC .. G06F 16/1824; G06F 16/164; G06F 16/148; G06F 16/178; G06F 16/1734
USPC .......................................................... 707/822
See application file for complete search history.

(56) References Cited

U.S. PATENT DOCUMENTS

| 8,239,936 | B2 | 8/2012 | Schneider |
| 9,710,482 | B2 | 7/2017 | Fitzgerald et al. |
| 2017/0270136 | A1* | 9/2017 | Chen ..................... G06F 16/178 |
| 2019/0065527 | A1* | 2/2019 | Shibata ............... G06F 9/45533 |

FOREIGN PATENT DOCUMENTS

WO WO-2008106260 A1 * 9/2008 ....... G06F 17/30132

OTHER PUBLICATIONS

Levine, S. (2018). "Logical Volume Manager Administration", Red Hat Customer Content Services, pp. 208.
Grattafiori, A. (Apr. 10, 2016). "Understanding and Hardening Linux Containers", Technical Director—NCC Group, pp. 122.
"Mount—Mount a Filesystem", (2020). https://manpages.debian.org/testing/mount/mount.8.en.html, pp. 35.

(Continued)

*Primary Examiner* — Isaac M Woo
(74) *Attorney, Agent, or Firm* — Womble Bond Dickinson (US) LLP

(57) ABSTRACT

A method includes receiving, an operation from a container to synchronize container data from memory to a file system mounted by the container and determining whether the file system indicates that the operation is to be ignored. The method further includes, in response to determining that the file system indicates that the operation is to be ignored, preventing, by the operating system kernel executing on the processing device, performance of the operation.

17 Claims, 6 Drawing Sheets

(56) References Cited

OTHER PUBLICATIONS

Danen, V. (Feb. 24, 2008). "Secure Temporary Files in Linux", Linux and Open Source, pp. 7.
Stamatakis, E. et al. "Scalability of Replicated Metadata Services in Distributed File Systems", Institute of Computer Science (ICS) Foundation for Research and Technology Hellas (FORTH), Greece, pp. 14.

* cited by examiner

SPEEDUP CONTAINERS IN PRODUCTION BY IGNORING SYNC TO FILE SYSTEM

REFERENCE TO RELATED APPLICATION

This application claims priority to U.S. Provisional Patent Application No. 63/051,289, entitled "SPEEDUP BUILD CONTAINER DATA ACCESS BY IGNORING SYNC TO FILE SYSTEM," filed Jul. 13, 2020, which is herein incorporated by reference in its entirety.

TECHNICAL FIELD

Aspects of the present disclosure relate to speedup of build container data access by ignoring syncs to file system.

BACKGROUND

A file system synchronization (sync) operation provides for saving changes to data in memory to a file system of persistent storage. Therefore, the data can be persisted even if system failure occurs, such as power outage. A container may be an isolated execution environment in which one or more applications can execute. The container and the applications of the container can request sync operations to be performed for data of the requesting applications.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Processes and applications running on a computer system may make writes to data in memory of the computer system. The processes and applications may request an operating system (OS) kernel to save the changes in memory to storage using one of several synchronization (sync) operations. Synchronizing data to storage may be an expensive operation in terms of compute cycles and resource consumption. The OS kernel may freeze other processes to perform the sync operation. In some circumstances, syncing data to storage may not be necessary. Therefore, sync operations performed under these circumstances may utilize resources unnecessarily. For example, during a build of a container image, the changes in memory may be disregarded if the build fails. Thus, sync operations for changes in memory during build of a container image may be excessive since the changes may be disregarded if the build fails or if system failure occurs. Therefore, any additional syncs requested by the container or applications of the container during the build of the container image may result in a significant waste of computer resources.

Aspects of the disclosure address the above-noted and other deficiencies by ignoring syncs to specified file systems mounted by a container. In one example, a container orchestration system may create a container. The container orchestration system may include an operation for mounting file systems for the container upon creation of the container. The container and applications within the container may access and use the mounted file systems for operation. The container orchestration system may add a flag to the metadata of the file system (e.g., in a metadata superblock) to indicate that syncs to the file system should not be performed. When a process of the container provides a sync operation to an operating system kernel to synchronize container data to persistent storage, the kernel may determine whether the metadata of the mounted file system indicates that the sync should not be performed. For example, the kernel may determine whether the metadata include the flag included in the metadata by the container orchestration system. If the metadata (e.g., the flag) indicates that the sync should not be performed, the kernel may ignore the sync operation and may return an indication to the requesting process that requested sync operation was successfully performed. In this way, the kernel may prevent sync operations to specified file systems without requiring changes to the processes and applications to be executed within a container.

Advantages of the present disclosure include faster access to container data since the data remains in memory for longer. Furthermore, ignoring sync operations to file systems of a container may reduce number of writes to file systems which may be important for file systems that allow limited number of writes. Additionally, the reduced number of sync operations may reduce unnecessary utilization of computer resources.

Figure 1:
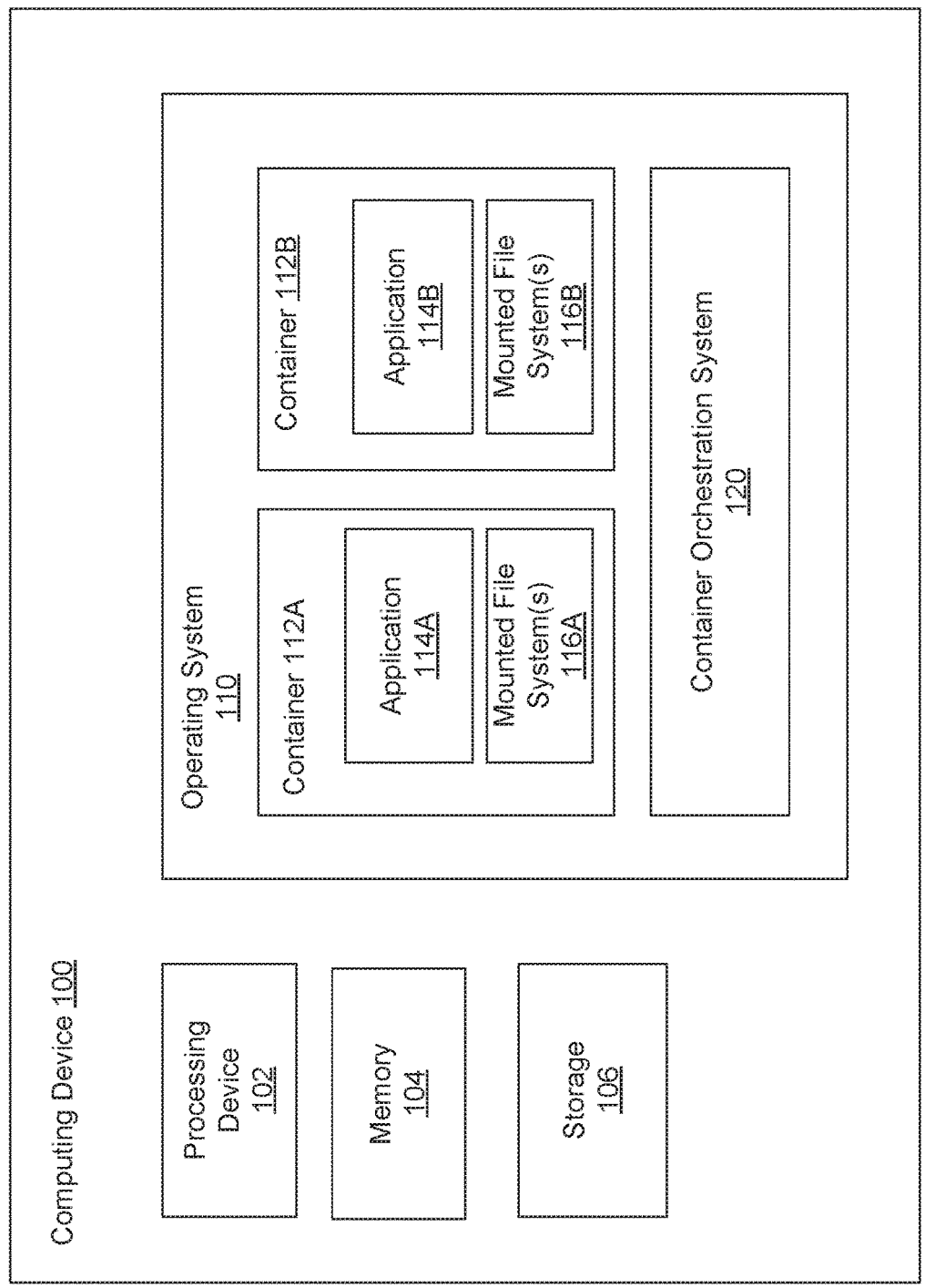
FIG. 1 is a block diagram of an example computer system, in accordance with embodiments of the present disclosure.

FIG. 1 depicts an example of a computing device 100 according to one embodiment. Computing device 100 includes a processing device 102, a memory 104, and storage 106. Computing device 100 may be any data processing device, such as a desktop computer, a laptop computer, a mainframe computer, a personal digital assistant, a rack-mount server, a hand-held device or any other device configured to process data. Processing device 102 may be may be a system on a chip, a processing core, a central processing unit (CPU), graphics processing unit (GPU), microprocessor or any other device with processing capabilities. Memory 104 may be may be volatile or non-volatile memory such as random access memory (RAM), dynamic random access memory (DRAM), static random access memory (SRAM), flash memory, or any other type of memory used by a computer system. Storage 106 may be may be local or remote persistent storage such as a hard-disk drive, flash storage, a solid state drive, or any other type of persistent data storage.

Computing device 100 further includes an operating system 110. A container orchestration system 120 may run on operating system 110. Container orchestration system 120 may initiate, build, and manage one or more containers 112A-B. Container orchestration system 120 may mount file systems required by each of the containers 112A-B at the time of building the containers 112A-B. In one example, containers 112A-B may include applications 114A-B to be executed within the containers 112A-B. The container orchestration system 120 may identify file systems required for operation of applications 112A-B and mount the required file systems (i.e., provide access to the file required file systems) to the containers 112A-B.

During initiation of the build of the containers 112A-B, the container orchestration system 120 may update metadata describing the mounted file systems 116A-B to indicate that sync operations received from the container mounting the file system are to be ignored. For example, a metadata file (referred to herein as a "superblock") may include information about the structure of the mounted file systems 116A mounted by container 112A for application 114A. The superblock may include a flag (e.g., "NOSYNC," "IGNORESYNC" or other indication) to indicate that sync operations to the file system associated with the superblock should be ignored. Therefore, when the operating system 110 forwards a synchronization operation to the file system, the file system may check the flag of the superblock to determine if the synchronization operation is to be ignored, as discussed in further detail with respect to FIG. 3 below.

In one embodiment, different file systems mounted by the same container may each individually be flagged to indicate whether sync operations to each file system are to be ignored. Therefore, ignoring sync operations may be performed at a per file system granularity. It should be noted that the same process may be performed at any level of granularity in a storage system (e.g., partition level, volume level, directory level, and so forth). For example, application 114A may be a database application for which data should be synced to storage to ensure that changes to the database are persisted. Mounted file systems 116A may include a first file system for the database application and a second file system for the container 112A. A flag in a superblock associated with the file system for container 112A may be set to ignore sync operations to the file system while the flag of the superblock associated with the file system for application 114A (e.g., a database application) may not be set, allowing sync operations to the file system to be performed as normal. Thus, sync operations for the container file system will be ignored while syncs for the application file system will be performed.

Figure 2:
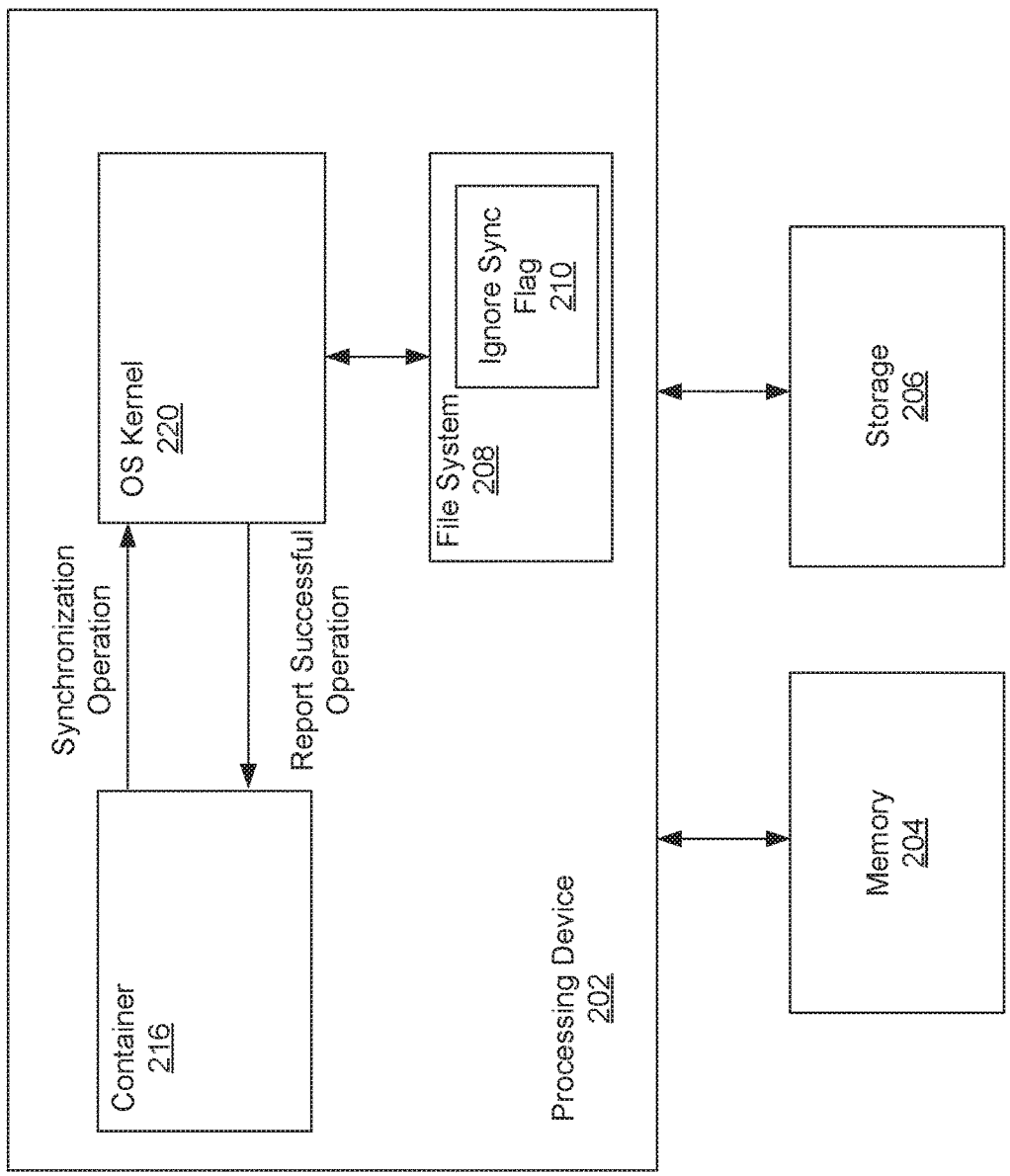
FIG. 2 is a block diagram illustrating an example computer system for ignoring synchronization operations to a file system of a container, in accordance with embodiments of the present disclosure.

FIG. 2 illustrates an example system 200 for ignoring sync operations to a file system, according to one embodiment. System 200 includes a container 216, an OS kernel 220, and a file system 208. Container 216 may be the same or similar to container 116, as described with respect to FIG. 1. OS kernel 220 may be the same or similar to OS kernel 120, as described with respect to FIG. 1. File system 208 may be the same or similar to one of file systems 108, as described with respect to FIG. 1. System 200 may also include a memory 204 and storage 206. In one example, container 216 may provide a request to the OS kernel 220 to execute a sync operation to file system 208. The request may be from the container 216 or from an application executing within the container 216. File system 208 may be a file system mounted by container 216. The OS kernel 220 may receive the request for the sync operation and identify a file system (e.g., file system 208) to which the sync operation is intended to sync container data in memory 204 to storage 206.

In one example, the OS kernel 220 may then query the file system 208 to determine whether metadata of the file system 208 indicates that sync operations should not be performed on the file system 208. In one example, file system 208 may include an ignore sync flag 210 to indicate to the OS kernel 220 that sync operations should not be performed on file system 208. The ignore sync flag 210 may be included in a metadata file (e.g., a superblock of the file system) describing the file system 208. Once the OS kernel 220 determines that the file system 208 includes an indication that sync operations are not to be performed on the file system 208, the OS kernel 220 may block operation of the sync operation and report to the container 216 that the sync operation was successful. In some instances, the container 216 or application that requested the sync operation may be programmed to pause operation as it waits for a report of success of the sync operation. By providing the report of success even though the sync operation was blocked, the container 216 and application of the kernel may continue operation as normal.

In one example, upon mounting the file system 208 to the container 216, a container orchestration system (e.g., container orchestration system 120 of FIG. 1) may set the ignore sync flag 210 based on a configuration of the file system 208 provided by a user or administrator. In another embodiment, the container orchestration system may remove the ignore sync flag 210 in response to the occurrence of a defined event, such as a successful build of the container 216. Therefore, by managing an ignore sync flag of each of the file systems mounted by containers, the container orchestration system may manage sync operations on a file system level and under defined circumstances.

Figure 3:
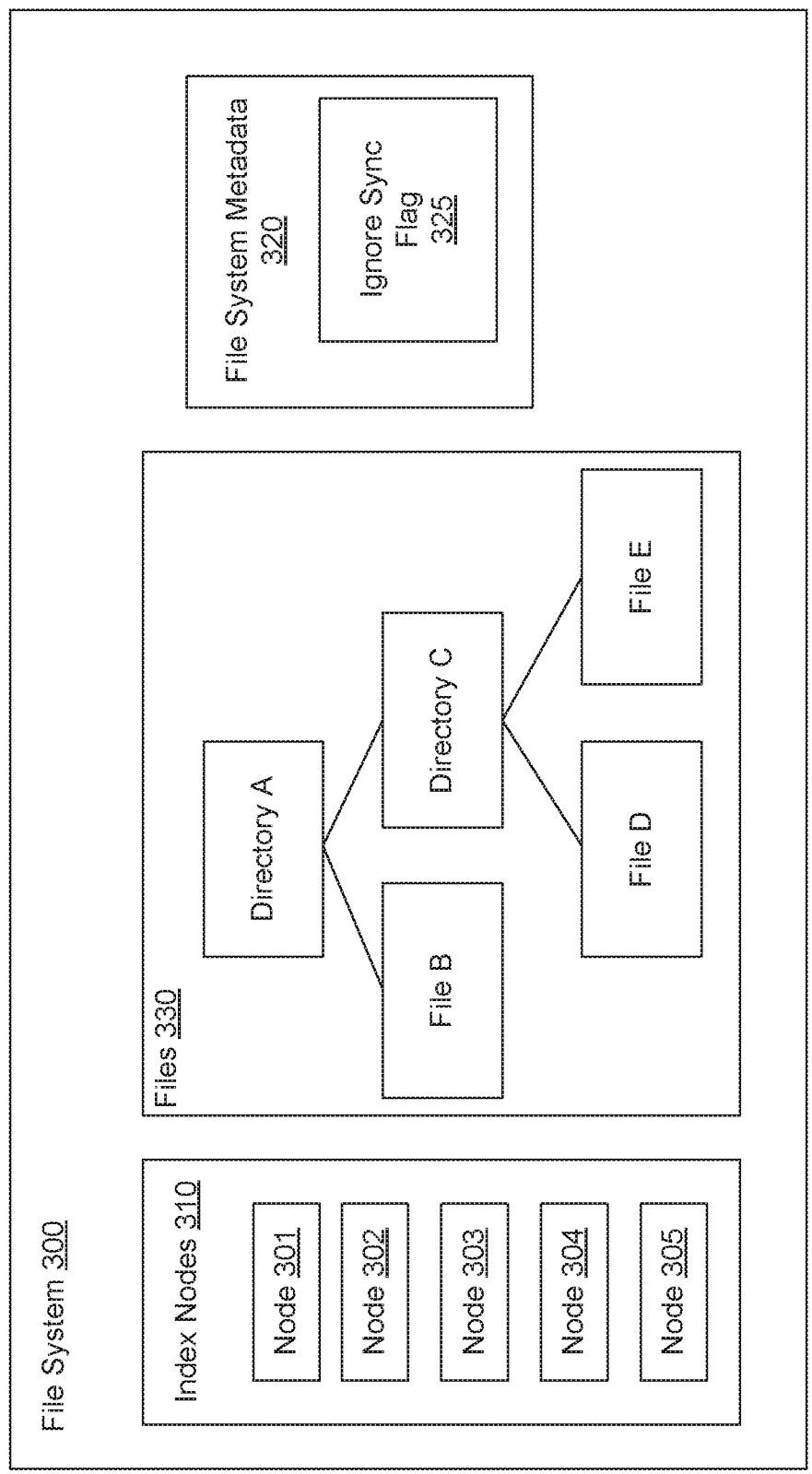
FIG. 3 is a block diagram illustrating an example file system in accordance with embodiments of the present disclosure.

FIG. 3 illustrates an example file system 300 configured to ignore sync operations. File system 300 includes index nodes 310, file system metadata 320 and files 330. Index nodes 310 may include metadata identifying a location of files or directories of the files 330. For example, each node 301-305 may include metadata identifying and describing one of the directories (e.g., directory A or directory C) or files (e.g., file B, file D, or file E). File system metadata 320 may include information about the file system structure and other information of the file system 300. In one example, file system metadata 320 includes an ignore sync flag 325 indicating that sync operations are not to be performed on the file system 300.

In one embodiment, the file system 300 may further include multiple file system metadata 320 files associated with a subset of the index nodes of the file system 300. In one example, the file system 300 may be mounted by a container. An OS kernel may receive a request from the container to perform a sync operation of changes to container data in memory to the file system 300. The OS kernel may then query the file system 300 to determine whether the ignore sync flag 325 is set to indicate to the OS kernel to ignore the sync operation. For example, the OS kernel may walk the file system to identify an index node that identifies the file associated with the sync operation. The OS kernel may then identify the file system metadata 320 from the identified index node (e.g., using a pointer included in the index node).

Figure 4:
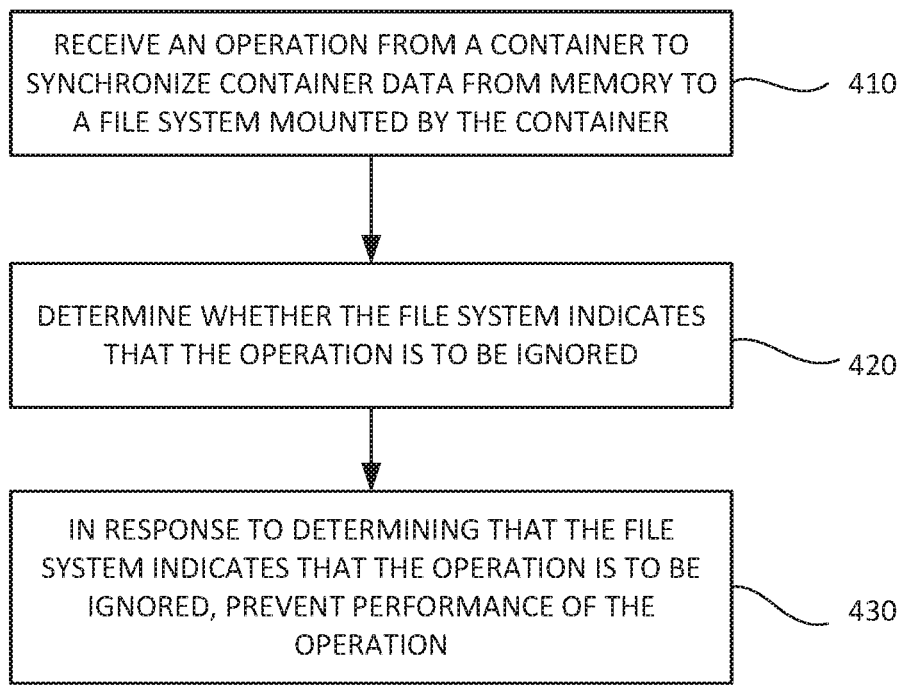
FIG. 4 is a flow diagram illustrating an example method for speedup of build container data access by ignoring synchronization to a file system, in accordance with embodiments of the present disclosure.

FIG. 4 is a flow diagram of a method 400 for ignoring sync operations to a file system, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by an operating system kernel, e.g., operating system kernel 120 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where processing logic receives an operation from a container to synchronize container data from memory to a file system mounted by the container. The operation may include any operation to perform a synchronization of changes in memory to persistent storage. For example, the operation may be a sync, fsync, fdatasync, msync, sync_file_range, syncfs, or any other memory to storage sync operation. The file system mounted by the container may include a file system mounted to the container upon instantiation of the container. In one embodiment, several file systems may be mounted to the container based on a configuration of the container.

At block 420, processing logic determines whether the file system indicates that the operation is to be ignored. In one example, the processing logic may query the file system to identify a file associated with the operation and identify a flag associated with the file. The flag indicating whether the operation to save container data to the file system is to be ignored. For example, the processing logic may walk the file system to identify a file associated with the sync operation. The file may include a pointer to a metadata file (e.g., a superblock) of the file system. The metadata file may include the flag. The processing logic may determine whether the flag indicates that the sync operation is to be ignored. In one example, the processing logic may receive a configuration of the file system. The configuration may indicate that sync operations to the file system are to be ignored. The processing logic may then set the flag associated with the file system in view of the configuration of the file system. In one example, the processing logic may receive a second synchronization operation from an application in the container, the second synchronization operation to save application data from memory to a second file system mounted by the container. The processing logic may determine that the second file system indicates that the second synchronization operation is to be performed. The processing logic may then perform the second synchronization operation to save application data from memory to the second file system. The file system and the second file system may be separate file systems that are mounted by the container.

At block 430, in response to determining that the file system indicates that the operation is to be ignored, processing logic prevents performance of the operation. In one example, the processing logic may prevent performance of any sync operations to the file system. In another example, the processing logic may prevent performance of a subset of all possible sync operations to the file system. After preventing the sync operation, the processing logic may then provide a response to the container that the operation was successful although the sync operation is not performed. Therefore, the application may proceed to execute as though the sync operation had been performed, even though execution of the sync operation was prevented.

Figure 5:
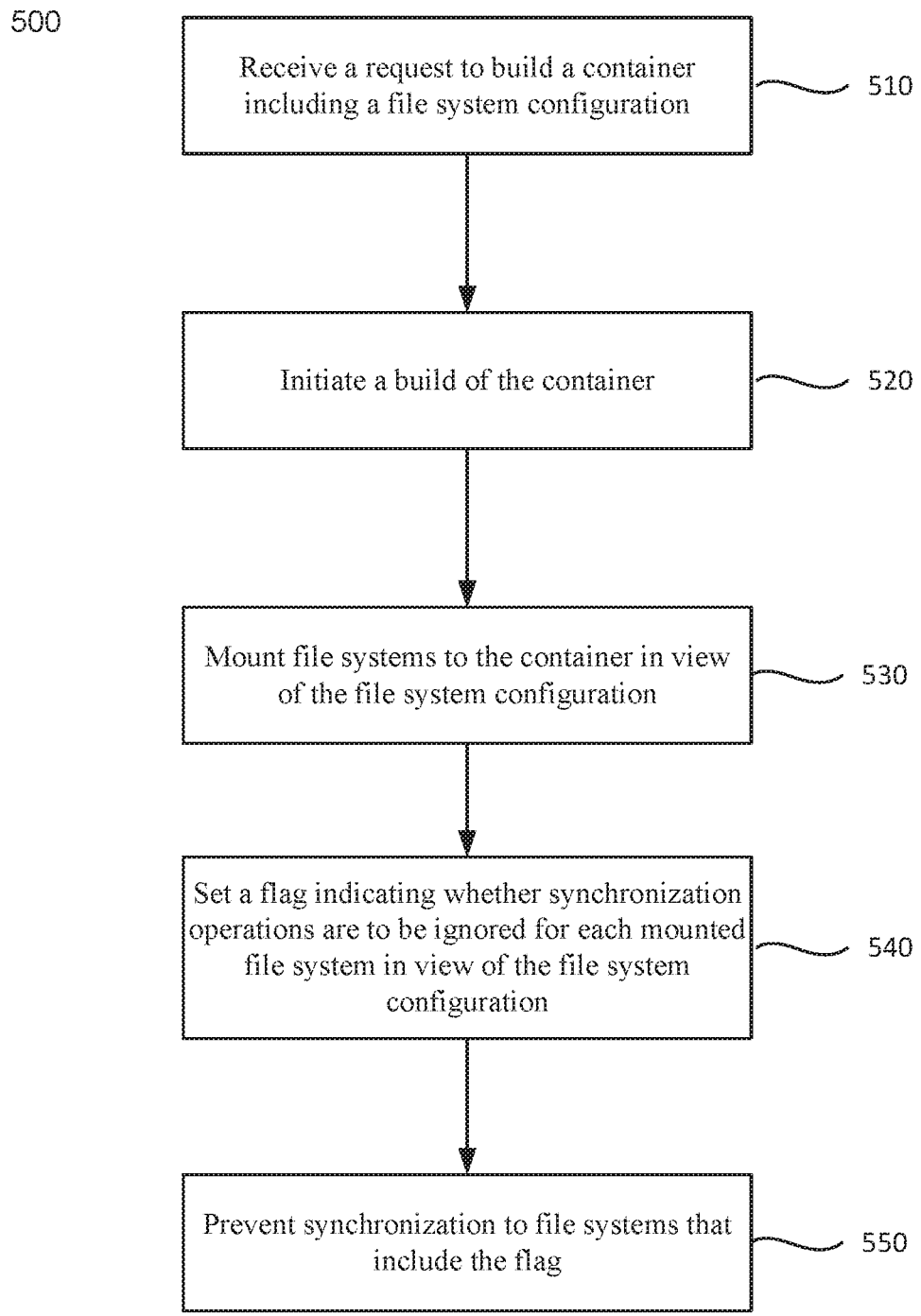
FIG. 5 is a flow diagram illustrating another example method for speedup of build container data access by ignoring synchronization to a file system, in accordance with embodiments of the present disclosure.

FIG. 5 is a flow diagram of a method 500 of configuring a file system to direct a OS kernel to ignore sync operations to the file system, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by a container orchestration system (e.g., container orchestration system 120).

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where processing logic receives a request to build a container. The request may include a file system configuration. The file system configuration may include each file system to be mounted to the container. The file system configuration may also include an indication of whether each file system is to ignore a sync operation. At block 520, processing logic initiates a build of the container. Building the container may further include instantiating container resources and container applications. At block 530, processing logic mounts file systems to the container in view of the file system configuration. During the mount operation, the kernel creates what is known as a superblock containing metadata for the file system.

At block 540, processing logic sets a flag of the file system indicating whether synchronization operations are to be ignored for each mounted file system in view of the file system configuration. The superblock may include a flag (e.g., "NOSYNC" or "SKIPSYNC," etc.) to indicate that the file system should ignore sync operations to that file system. At block 550, processing logic prevents synchronization to file systems that include the flag indicating that synchronization operations are to be ignored. In one example, when a sync operation is received, the kernel may walk the file system using the file system metadata to find the file metadata, referred to as an "inode." Each inode may point to and be associated with file system level metadata (e.g., a superblock). Any operation performed on the file may determine the associated inode. The inode may then reference the superblock. The superblock may store the ignore sync flag for preventing sync operations for the entire file system.

In one example, multiple file systems may be mounted to a container. For example, the container may include a database application executing in the container. One file system may be mounted for the container and one file system may be mounted for the database application to store the data of the application. In one instance, syncs to the file system for the container may ignored while syncs to the file system for the database application may be performed. Accordingly, each file system can be addressed individually using a flag or other metadata associated with each file system. Therefore, the kernel may be configured to ignore sync operations to certain file systems and configure others to be persisted depending on the file requirements of the container configuration.

Figure 6:
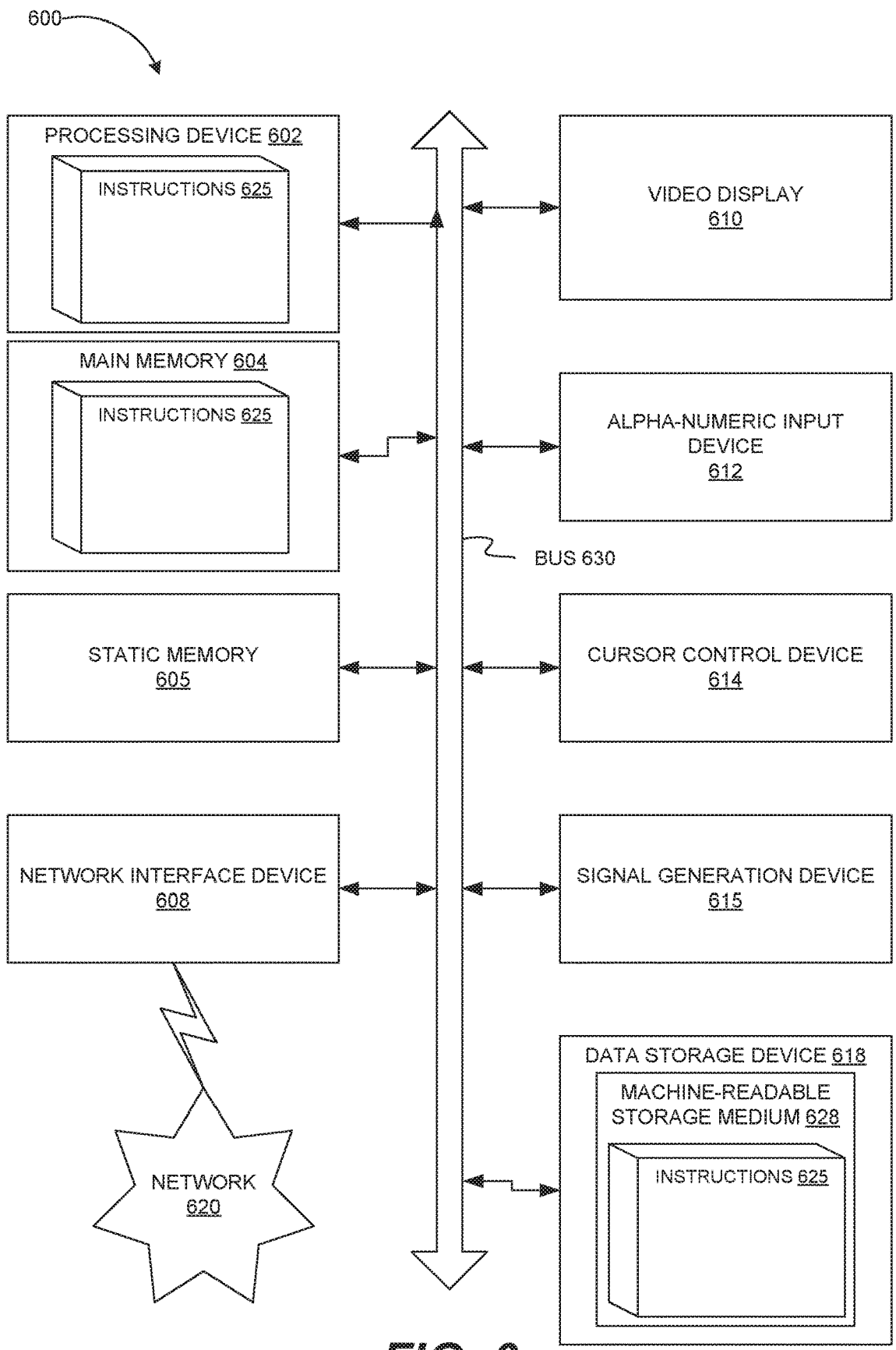
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   initializing a build of a container, wherein the container is an isolated execution environment of a computing device;
   during the initializing, mounting a file system of the container and flagging the file system of the container to indicate that requests to synchronize the file system of the container are to be ignored during the build of the container; and
   during the build of the container:
      saving container data in a volatile memory of the computing device allocated to the container;
      receiving a sync operation from the container at an operating system kernel, wherein the sync operation requests the operating system kernel to synchronize the container data from the volatile memory allocated to the container to a persistent storage of the computing device allocated to the container for persistent storage of the file system;
      determining, by a processing device executing an operating system kernel, whether the file system indicates that the sync operation is to be ignored; and
      in response to determining that the file system indicates that the sync operation is to be ignored, preventing performance of the sync operation while providing a response to the container that the sync operation was successfully performed by the processing device executing the operating system kernel.

2. The method of claim 1, further comprising:
   querying the file system to identify a file associated with the sync operation; and
   identifying a flag associated with the file, the flag indicating whether the sync operation to save container data to the file system is to be ignored.

3. The method of claim 2, wherein identifying the flag comprises:
   identifying a metadata file of the file system associated with the file, wherein the flag is identified from the metadata file of the file system.

4. The method of claim 1, further comprising:
   receiving a configuration of the file system, the configuration comprising an indication that synchronization operations are to be ignored for the file system; and
   setting a flag associated with the file system to indicate that synchronization operations to the file system are to be ignored.

5. The method of claim 1, further comprising:
   receiving a second operation from an application in the container, the second operation to save application data from memory to a second file system mounted by the container;
   determining that the second file system indicates that the second operation is to be performed; and
   performing the second operation to save application data from memory to the second file system.

6. The method of claim 5, wherein the file system and the second file system are separate file systems mounted by the container.

7. A system comprising:
   a memory; and
   a processing device operatively coupled to the memory, the processing device to:
   initialize a build of a container, wherein the container is an isolated execution environment of a computing device;
   during the initializing, mount a file system of the container and flag the file system of the container to indicate that requests to synchronize the file system of the container are to be ignored during the build of the container; and
   during the build of the container:
      save container data in a volatile memory of the computing device allocated to the container;
      receive a sync operation from the container at an operating system kernel, wherein the sync operation requests the operating system kernel to synchronize the container data from the volatile memory allocated to the container to a persistent storage of the computing device allocated to the container for persistent storage of the file system;

determine whether the file system indicates that the sync operation is to be ignored; and in response to determining that the file system indicates that the sync operation is to be ignored, prevent performance of the sync operation and provide a response to the container that the sync operation was successfully performed by the processing device executing the operating system kernel.

8. The system of claim 7, wherein the processing device is further to:

query the file system to identify a file associated with the sync operation; and identify a flag associated with the file, the flag indicating whether the sync operation to save container data to the file system is to be ignored.

9. The system of claim 8, wherein to identify the flag the processing device is to:

identify a metadata file of the file system associated with the file, wherein the flag is identified from the metadata file of the file system.

10. The system of claim 7, wherein the processing device is further to:

receive a configuration of the file system, the configuration comprising an indication that synchronization operations are to be ignored for the file system; and set a flag associated with the file system to indicate that synchronization operations to the file system are to be ignored.

11. The system of claim 7, the processing device is further to:

receive a second operation from an application in the container, the second operation to save application data from memory to a second file system mounted by the container;

determine that the second file system indicates that the second operation is to be performed; and perform the second operation to save application data from memory to the second file system.

12. The system of claim 11, wherein the file system and the second file system are separate file systems mounted by the container.

13. A non-transitory computer-readable storage medium including instructions that, when executed by a processing device, cause the processing device to:

initialize a build of a container, wherein the container is an isolated execution environment of a computing device;

during the initializing, mount a file system of the container and flag the file system of the container to indicate that requests to synchronize the file system of the container are to be ignored during the build of the container; and during the build of the container:

save container data in a volatile memory of the computing device allocated to the container;

receive a sync operation from the container at an operating system kernel, wherein the sync operation requests the operating system kernel to synchronize the container data from the volatile memory allocated to the container to a persistent storage of the computing device allocated to the container for persistent storage of the file system;

determine, by the processing device, whether the file system indicates that the sync operation is to be ignored; and in response to determining that the file system indicates that the sync operation is to be ignored, prevent, by the processing device, performance of the sync operation and provide a response to the container that the sync operation was successfully performed by the processing device executing the operating system kernel.

14. The non-transitory computer-readable storage medium of claim 13, wherein the processing device is further to:

query the file system to identify a file associated with the sync operation; and identify a flag associated with the file, the flag indicating whether the sync operation to save container data to the file system is to be ignored.

15. The non-transitory computer-readable storage medium of claim 14, wherein to identify the flag the processing device is to:

identify a metadata file of the file system associated with the file, wherein the flag is identified from the metadata file of the file system.

16. The non-transitory computer-readable storage medium of claim 13, wherein the processing device is further to:

receive a configuration of the file system, the configuration comprising an indication that synchronization operations are to be ignored for the file system; and set a flag associated with the file system to indicate that synchronization operations to the file system are to be ignored.

17. The non-transitory computer-readable storage medium of claim 13, the processing device is further to:

receive a second operation from an application in the container, the second operation to save application data from memory to a second file system mounted by the container;

determine that the second file system indicates that the second operation is to be performed; and perform the second operation to save application data from memory to the second file system.

* * * * *